United States Patent
Wang et al.

(10) Patent No.: US 11,483,776 B1
(45) Date of Patent: Oct. 25, 2022

(54) SYSTEMS AND METHODS FOR DYNAMIC PER-BEAM ADJUSTMENT OF OUTPUT POWER IN A WIRELESS NETWORK

(71) Applicant: Verizon Patent and Licensing Inc., Basking Ridge, NJ (US)

(72) Inventors: Xin Wang, Morris Plains, NJ (US); Krishnamurthy Sreenath, Hillsborough, NJ (US); Emad M. Abuqabaita, Folsom, CA (US); Arvind Kumar, Princeton, NJ (US); Nischal Patel, Hillsborough, NJ (US); Ahmed Moussa, Montclair, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 8 days.

(21) Appl. No.: 17/238,853

(22) Filed: Apr. 23, 2021

(51) Int. Cl.
*H04W 52/30* (2009.01)
*H04W 52/16* (2009.01)
*H04B 7/0408* (2017.01)
*H04W 16/28* (2009.01)

(52) U.S. Cl.
CPC .......... *H04W 52/30* (2013.01); *H04B 7/0408* (2013.01); *H04W 16/28* (2013.01); *H04W 52/16* (2013.01)

(58) Field of Classification Search
CPC ..... H04W 52/30; H04W 16/28; H04W 52/16; H04W 52/42; H04B 7/088; H04B 7/0408; H04B 7/0426; H04B 7/061; H04B 7/0623; H04B 7/18543
See application file for complete search history.

(56) References Cited

U.S. PATENT DOCUMENTS

2016/0066197 A1\* 3/2016 Park ..................... H04B 7/0695
370/329
2020/0187128 A1\* 6/2020 Yao ..................... H04W 52/325

\* cited by examiner

*Primary Examiner* — Mohamed A Kamara

(57) ABSTRACT

A system described herein may provide a technique for determining a maximum and/or target output power on a per-beam and/or per-direction basis for a base station of a radio access network ("RAN") that implements multiple beams for which output power is dynamically adjustable. The maximum and/or target output power for a given beam (or set of beams) for a given time period may be determined based on historical output power information associated with the beam over one or more previous time periods. The maximum and/or target output power may be based on a predicted received signal power within a coverage area of the base station, based on varying levels of output power.

20 Claims, 10 Drawing Sheets

SYSTEMS AND METHODS FOR DYNAMIC PER-BEAM ADJUSTMENT OF OUTPUT POWER IN A WIRELESS NETWORK

BACKGROUND

Wireless networks may utilize beamforming or other suitable techniques by which the amount of power used to output radio frequency ("RF") signals may vary over time on a per-beam or a per-direction basis. Thus, at different locations within the coverage area of a base station of a wireless network, the amount of received radio power (e.g., as expressed in terms of milliwatts per square centimeter ($mW/cm^2$ or some other suitable unit of measurement)) may also vary over time.

DETAILED DESCRIPTION OF EXAMPLE EMBODIMENTS

The following detailed description refers to the accompanying drawings. The same reference numbers in different drawings may identify the same or similar elements.

Embodiments described herein provide for the tracking and adjustment of output power or radiated power (referred to herein as "output power") on a per-beam and/or per-direction basis in a wireless network that includes one or more RANs that provide wireless service in a differentiated manner on a per-beam and/or per-direction basis. For example, a RAN (e.g., a Long-Term Evolution ("LTE") RAN, a Fifth Generation ("5G") RAN, or some other type of RAN) may include one or more base stations (e.g., an evolved Node B ("eNB"), a Next Generation Node B ("gNB"), and/or some other type of base station) that utilize beamforming techniques, Multiple-Input Multiple-Output ("MIMO") techniques, and/or other suitable techniques in which output power of one or more antennas may be dynamically adjusted on a per-direction basis. For example, such techniques may allow the base station to output RF signals at a first power in a particular direction during a first time window, and to output RF signals at a second power in the particular direction during a second time window.

In some situations, a network operator or other entity associated with a RAN may seek to limit the amount of power used to output RF signals (referred to herein as "output power") in a given direction and/or at particular locations within a coverage area of a given RAN. For example, such limits may be based on power saving goals, interference mitigation, target and/or maximum amounts of received radio power at such locations, and/or other goals or targets. As described herein, some embodiments may track and/or compute amounts of historical output power on a per-beam and/or per-direction basis, and may determine maximum output power information on a per-beam and/or per-direction basis based on the historical output power, in order to achieve power savings goals, maximum received power targets, and/or other goals or targets.

Figure 1:
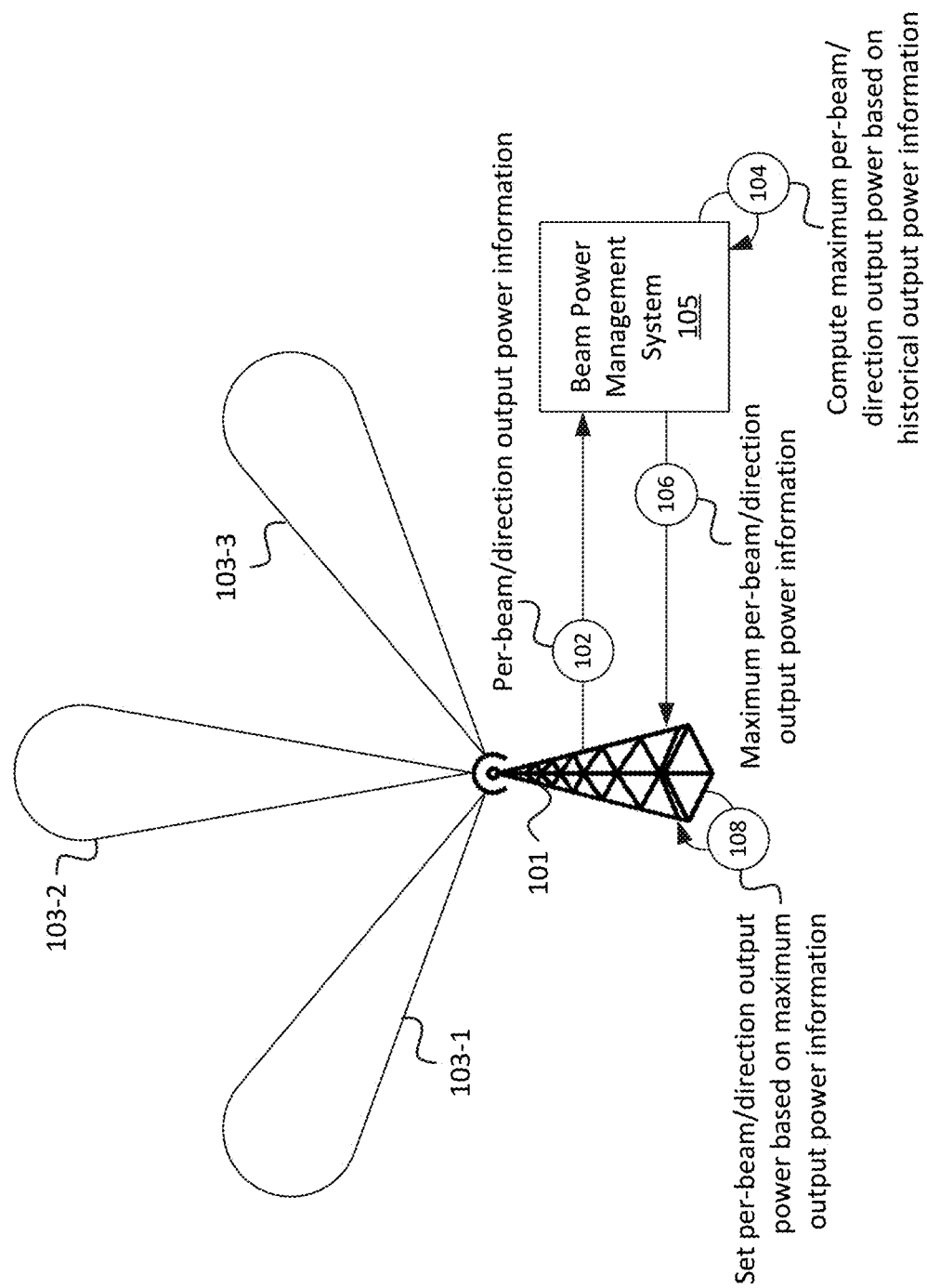
FIG. 1 illustrates an example overview of one or more embodiments described herein.

As shown in FIG. 1, for example, base station 101 may output RF signals in multiple directions. Example beams 103-1, 103-2, and 103-3 conceptually represent three beams, beam groups, and/or otherwise represent directions of RF transmissions from base station 101. In some embodiments, the term "beam 103" may refer to a set of beams that includes a single beam or multiple beams or beam groups. While example beams 103-1, 103-2, and 103-3 are shown in FIG. 1, in practice, base station 101 may be associated with fewer, additional, and/or different beams and/or groups of beams. Further, in some embodiments, different beams and/or groups of beams may be associated with different directions in three dimensions (e.g., where such beams or beam groups may be defined or characterized by a tilt angle and an azimuth angle, or other indicator of directionality in three dimensions). In some embodiments, different beams and/or groups of beams may be associated with different directions in two dimensions (e.g., where such beams or beam groups may be defined or characterized by an azimuth angle, or other indicator of directionality in two dimensions).

At different times (e.g., during different time periods or time windows), base station 101 may allocate different amounts of output power to beams 103-1, 103-2, and/or 103-3 (sometimes referred to individually as "beam 103" or collectively as "beams 103"). To set the output power for a particular beam 103 or direction, base station 101 may set an antenna gain for the particular beam 103 (e.g., an antenna pointing in a direction corresponding to the particular beam 103), may allocate a set of RF resources (e.g., Physical Resource Blocks ("PRBs")) for the particular beam 103, may set a conducted power for the particular beam 103, and/or may perform one or more other suitable operations to set the output power for the particular beam 103 or direction. For example, during a first time period, base station 101 may allocate a relatively large amount of output power to beam 103-1 and a relatively small amount of output power to beam 103-2, and during a second time period may allocate a relatively small amount of output power to beam 103-1 and a relatively large amount of output power to beam 103-2.

In this manner, base station 101 may provide varying amounts of coverage to different locations or regions within a coverage area associated with base station 101 at different times. Such varying amounts of coverage may be due to, for example, demand for wireless service in certain locations or regions, quantity of devices (e.g., User Equipment ("UEs"), such as mobile telephones, Internet of Things ("IoT") devices, Machine-to-Machine ("M2M") devices, etc.) connected to base station 101, and/or other factors.

Base station 101 may be communicatively coupled to Beam Power Management System ("BPMS") 105. For example, base station 101 may communicate with BPMS 105 via one or more networks, application programming interfaces ("APIs"), and/or other suitable communication pathways. In some embodiments, base station 101 and BPMS 105 may be implemented by the same device or set of devices. In some embodiments, BPMS 105 may be an internal component of, and/or may be communicatively coupled to an internal component of, a core network (e.g., an Evolved Packet Core ("EPC"), a Fifth Generation Core ("5GC"), or other type of core network) with which base station 101 is associated.

Base station 101 may provide (at 102) per-beam and/or per-direction output power information to BPMS 105. For example, base station 101 may indicate an amount of antenna gain associated with each respective beam 103 (e.g., an amount of antenna gain used by one or more antennas that implement respective beams 103), a quantity of PRBs allocated for each beam 103, an amount of conducted power provided to antennas implementing beams 103, and/or other information indicating an amount of output power (e.g., radiated power) associated with respective beams 103. For example, base station 101 may "push" the output power information to BPMS 105 (e.g., without a specific request from BPMS 105 for such information, and/or independent of such a request) on a periodic basis, an intermittent basis, an event-based basis, or some other ongoing basis. Additionally, or alternatively, BPMS 105 may "pull" the output power information from BPMS 105 by requesting, polling, etc. such information on a periodic basis, an intermittent basis, an event-based basis, or some other ongoing basis. In this manner, BPMS 105 may monitor, on a per-time as well as a per-beam and/or per-direction basis, amounts of output power associated with base station 101.

As discussed below, base station 101 may further generate historical output models and/or other information indicating historical output power associated with base station 101, on a per-beam and/or per-direction basis. The historical output power information may reflect an average (e.g., a moving average), median, maximum, minimum, and/or other computed value based on the output power information received (at 102) over time, on a per-beam and/or per-direction basis.

Based on the received (at 102) output power information and the historical output power information determined therefrom, BPMS 105 may compute (at 104) a maximum per-beam and/or per-direction output power for base station 101. For example, as discussed above, BPMS 105 may identify one or more power targets (e.g., target output power over time, target received power over time, and/or other factors) and may determine a maximum output power (e.g., over a subsequent time period) for each beam 103, such that allocating such output power for a given beam 103 would not exceed or otherwise defeat the one or more power targets.

BPMS 105 may provide (at 106) the maximum per-beam and/or per-direction output power information to base station 101, which may set (at 108) the output powers respectively associated with beams 103-1, 103-2, and/or 103-3 based on the maximum output power information and/or one or more other factors. For example, base station 101 may set the output power of beams 103-1, 103-2, and/or 103-3 based on one or more factors discussed above such as demand, quantity of connected UEs, and/or other factors, and further based on the maximum output power indicated by BPMS 105. For example, in situations where base station 101 determines (e.g., based on demand, quantity of connected UEs, etc.) that the output power for a given beam 103 should be set to a particular amount that exceeds the maximum output power for the given beam 103, base station 101 may "cap" or reduce the determined output power to the maximum output power indicated by BPMS 105. In this manner, base station 101 may refrain from setting output power associated with a given beam 103 to an amount of power that exceeds one or more targets identified by BPMS 105 (e.g., energy consumption targets, received power targets, etc.).

Figure 2:
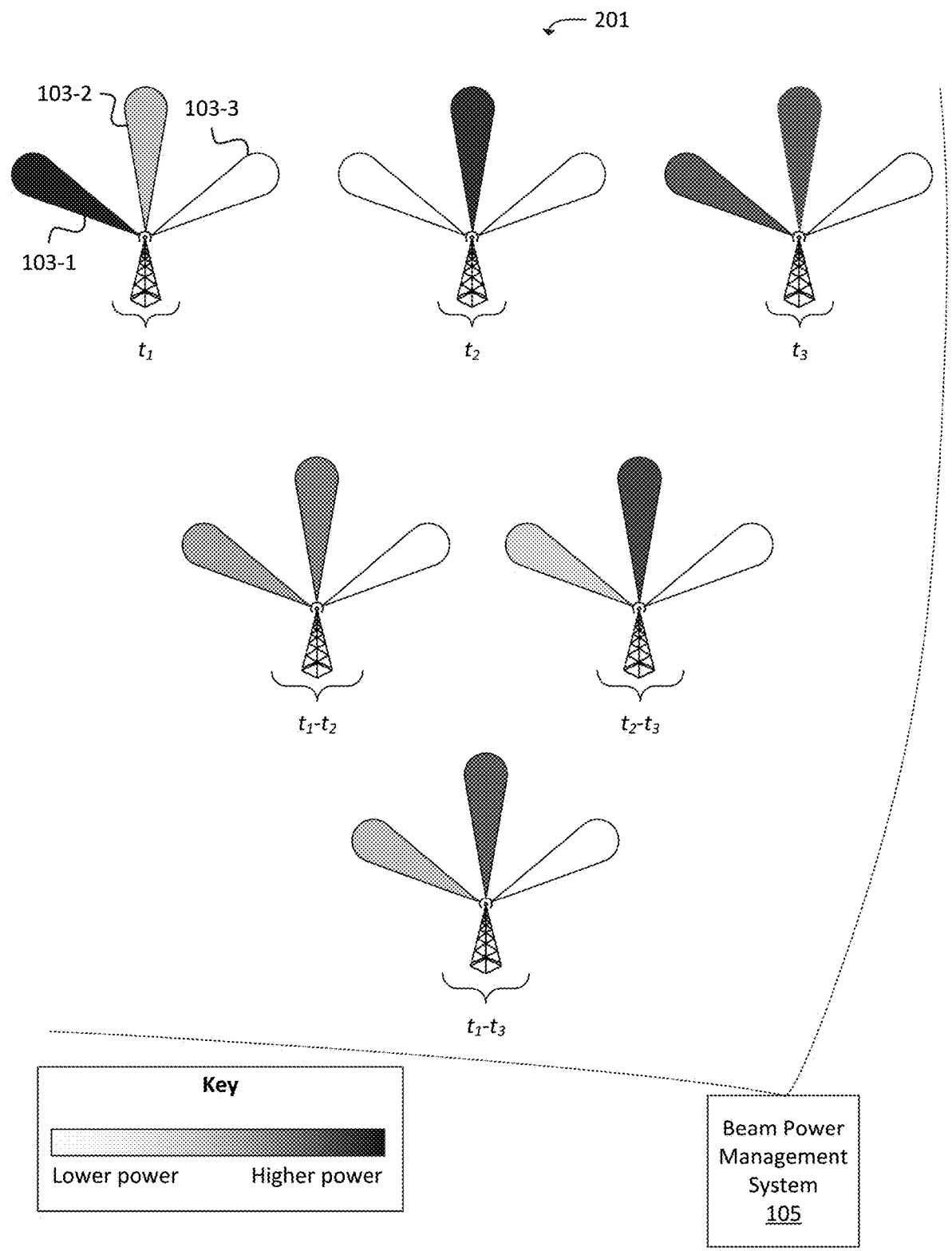
FIG. 2 illustrates historical output power information associated with one or more beams implemented by a base station, in accordance with one or more embodiments described herein.

FIG. 2 illustrates an example of historical output power information 201, which may be determined and/or generated by BPMS 105, and/or may include output power information associated with base station 101 (e.g., as received at 102). The representations shown here may not resemble a manner in which BPMS 105 stores historical output power information 201. For example, the information represented in FIG. 2 may be stored via one or more tables, arrays, linked lists, trees, databases, or other types of data structures. As such, the representations shown in FIG. 2 conceptually illustrate information that may be stored by BPMS 105.

Amounts of output power associated with each of beam 103-1, 103-2, and 103-3 are illustrated at three different times (e.g., three different time periods, intervals, windows, etc.). For example, historical output power information 201 may include amounts of output power associated with beam 103-1, 103-2, and 103-3 at times $t_1$, $t_2$, and $t_3$. A particular time t may refer to a particular time window, such as about a 1-millisecond time window, a 1-second time window, a 10-second time window, and/or some other time window. The amounts of power over a given time window are reflected in this figure by shading, where lighter shading indicates less output power over a given time period while darker shading indicates a greater amount of output power over a given time period. Further, while reference numerals in FIG. 2 for beams 103 at time $t_1$, these same beams may be represented at the other time periods illustrated in FIG. 2.

For example, at time $t_1$ (e.g., as indicated by base station 101), beam 103-1 may have been associated with a relatively high amount of output power, beam 103-3 may be associated with a relatively low amount of output power, and beam 103-2 may have been associated with an amount of power in between that of beams 103-1 and 103-3. At time $t_2$, beams 103-1 and 103-3 may have been associated with a relatively low amount of output power, and beam 103-2 may have been associated with a relatively high amount of output power. Additionally, at time $t_3$, beams 103-1 and 103-2 may have been associated with a relatively moderate amount of output power, and beam 103-3 may have been associated with a relatively low amount of output power.

BPMS 105 may compute further historical output power information associated with beams 103 based on the monitored output power information provided by base station 101. For example, BPMS 105 may compute average output power information over time (e.g., multiple time windows) based on the output power information provided by base station 101. For example, as shown in FIG. 2, BPMS 105 may compute average output power associated with times $t_1$ and $t_2$ (shown as $t_1$-$t_2$). For example, in the computed average output power information for times $t_1$-$t_2$, beam 103-1 may be associated with a measure of output power between the relatively high output power at time $t_1$ and the relatively low output power at time $t_2$. Further, in the computed average output power information for times $t_1$-$t_2$, beam 103-2 may be associated with a measure of output power between the relatively moderate output power at time $t_1$ and the relatively high output power at time $t_2$. Additionally, in the computed average output power information for times $t_1$-$t_2$, beam 103-3 may be associated with a relatively low measure of output power, as the output powers associated with beam 103-3 at times $t_1$ and $t_2$ was also relatively low (e.g., as indicated by the white shading, or lack of shading, at these times).

As also shown, BPMS 105 may similarly compute average output values for respective beams 103 over time windows $t_2$ and $t_3$ (shown as $t_2$-$t_3$). Additionally, BPMS 105 may compute average output power values for respective beams 103 over time windows $t_1$, $t_2$, and $t_3$ (shown as $t_1$-$t_3$). In this manner, BPMS 105 may compute average output power values for any suitable time window or group of time windows. While the term "average" is used herein, in practice, BPMS 105 may compute median output power values, maximum output power values, minimum output power values, a standard deviation of output power values, and/or some other function or computation derived from output power values associated with particular beams 103 over given time windows. Thus, when the term "average" output power value is referred to herein, such "average" output power values may refer to any suitable computed or derived value based on output powers associated with multiple time windows (e.g., as determined and/or provided by base station 101).

Figure 3:
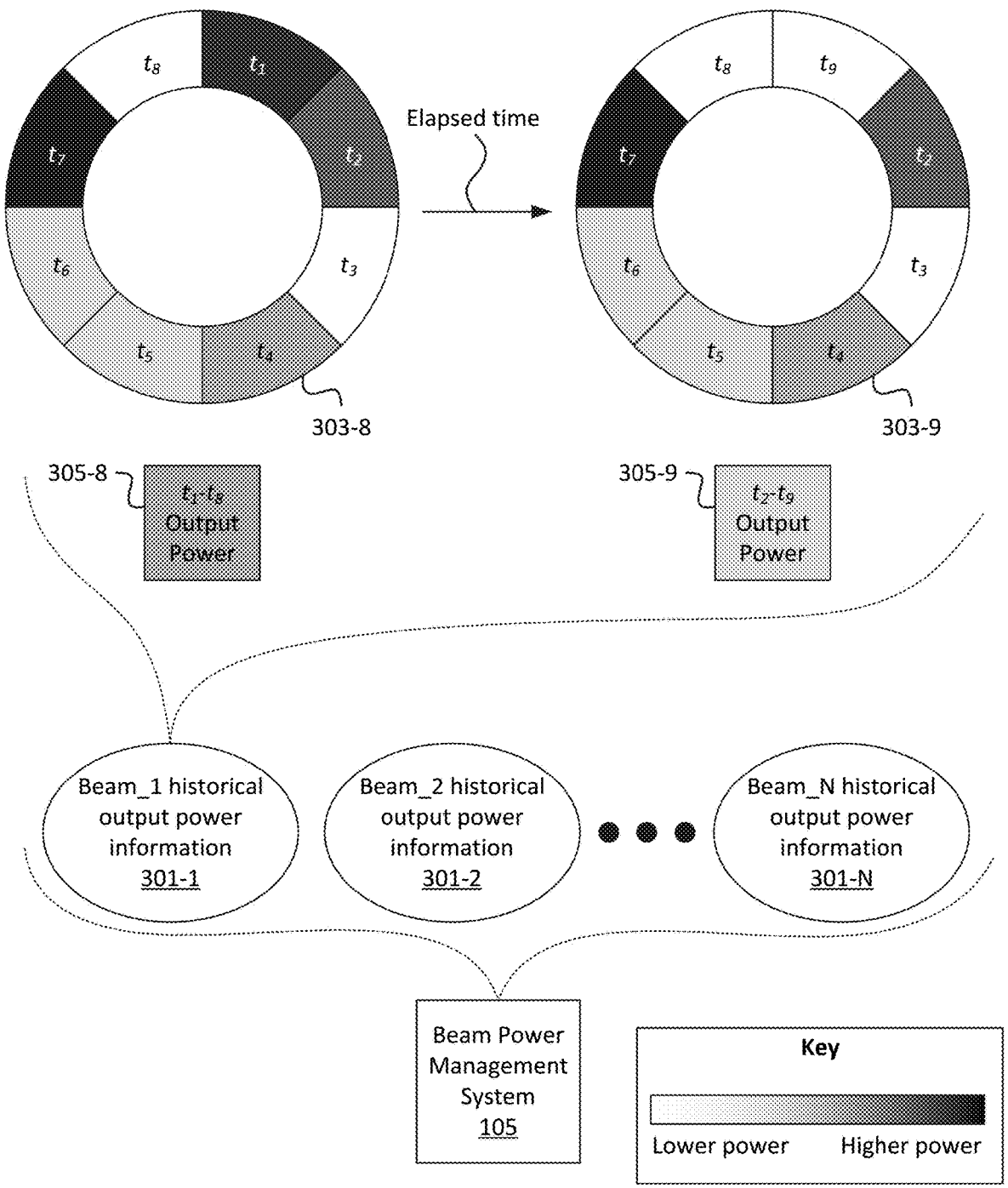
FIG. 3 illustrates an example ring buffer, which may be used to indicate output power information associated with a particular beam or set of beams, in accordance with one or more embodiments described herein.

In some embodiments, BPMS 105 may utilize any suitable manner for reflecting average output power values on a per-beam and/or per-direction basis over time. For example, as shown in FIG. 3, BPMS 105 may maintain historical output power information 301-1 associated with beam 103-1, historical output power information 301-2 associated with beam 103-2, historical output power information 301-N associated with beam 103-N, and so on. Historical output power information 301-1 may include one or more ring buffers, which may include output power values associated with a set quantity of times or time periods. For example, ring buffer 303 associated with historical output power information 301-1 may include 8 slots, where each slot includes output power information associated with one particular time t or time period. In practice, ring buffer 303 may include additional or fewer slots. As output power information is received, the oldest output power information may be replaced with the newest output power information, such that ring buffer 303 always maintains output power information for the most recent 8 times t or time periods.

Ring buffer 303-8 may be a state of ring buffer 303, associated with historical output power information 301-1, that reflects output power information up to time $t_8$. For example, ring buffer 303-8 may include output power information between times $t_1$ and $t_8$. Ring buffer 303-8 may be associated with average output power information 305-8, which may be derived, computed, etc. from the output power information reflected in ring buffer 303-8. As further shown, after time has elapsed (e.g., based on received output power information that is associated with time $t_9$), the output power information associated with time $t_1$ may be replaced with output power information associated with time $t_9$, as reflected in ring buffer 303-9. Further, ring buffer 303-9 may be associated with average output power information 305-9, which may be different from average output power information 305-8, based on the replacement of the output power information associated with time $t_1$ with the output power information associated with time $t_9$.

In some embodiments, BPMS 105 may utilize one or more other techniques in addition to, or in lieu of, a ring buffer for maintaining up-to-date output power information and/or for computing average output power information. For example, in some embodiments, BPMS 105 may utilize an infinite impulse response ("IIR") filter, in which the average output power may be computed based on a recursive technique based on previous average output power values. For example, when a new output power value is received (e.g., from base station 101), the average output power P may be computed based on one or more previously computed average output values $P_v$, the new output power value x, and/or a "forgetting" factor or constant a, as reflected in Formula 1 below:

$$P=(1-a)P_v+a^*x, \text{ where } 0<a<1 \qquad \text{(Formula 1)}$$

In some embodiments, BPMS 105 may utilize a token bucket technique for determining an average output power based on multiple received output power values for a given beam 103 and/or direction. For example, "tokens" based on a threshold allowable power value may be periodically and/or intermittently injected into a "bucket," and may be removed based on amounts of output power reported by base station 101. The maximum allowable power at a given time t may thus be determined based on a quantity or amount of tokens in the bucket at the time t. In some embodiments, BPMS 105 may utilize one or more other suitable techniques for tracking average output power values on a per-beam or per-direction basis.

Figure 4:
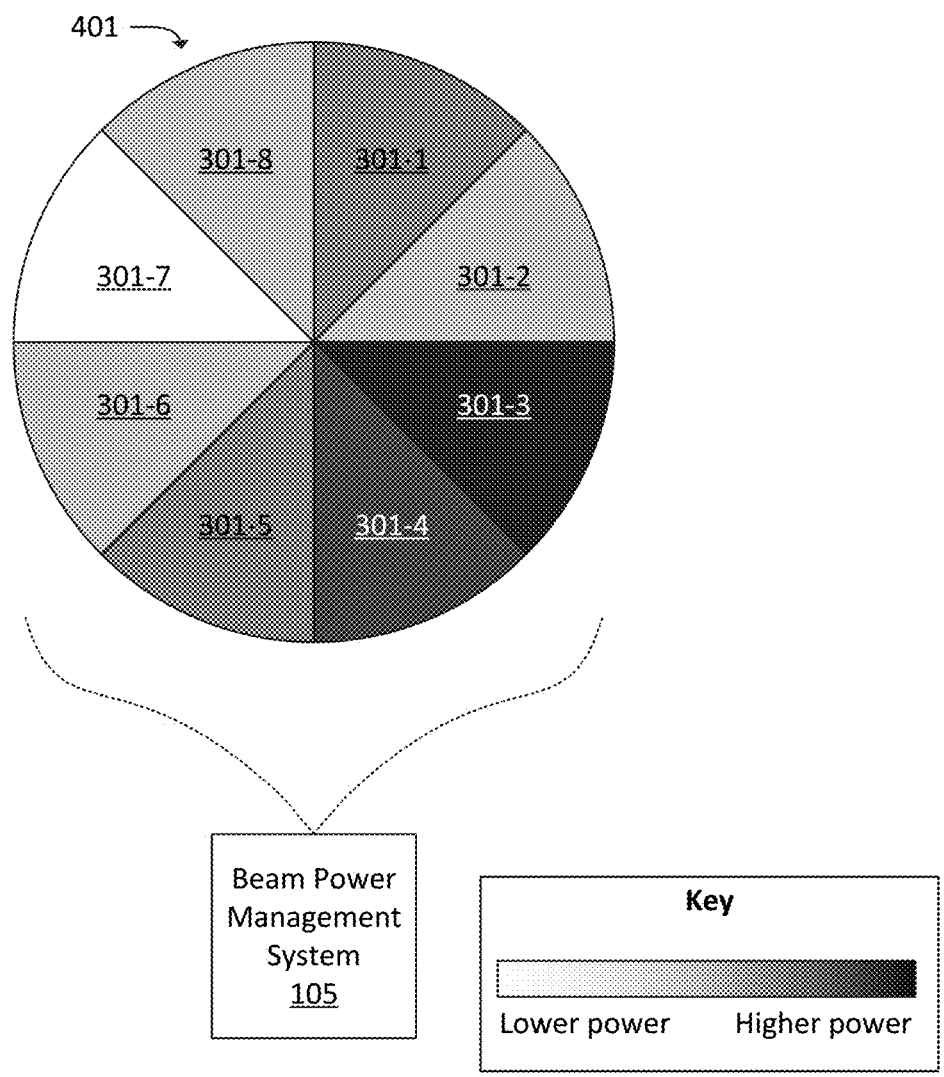
FIG. 4 illustrates an example heat map, which may be used to indicate output power information associated with multiple beams or sets of beams associated with a base station, in accordance with one or more embodiments described herein.

FIG. 4 conceptually illustrates historical output power information 301 for multiple beams 103. For example, heat map 401 may be a two-dimensional view (e.g., an overhead view) of a coverage area associated with a particular base station 101, and/or may otherwise represent a coverage area associated with base station 101. In practice, three-dimensional representations and/or other types of representations may be used to indicate the same or similar information as is represented in heat map 401.

As noted above, historical output power information 301 may include an average output power associated with a particular beam 103 over a particular time period, and/or other output power information associated with a particular beam 103. Heat map 401 may reflect a measure of output power (e.g., average output power) associated with particular beams 103 (e.g., as reflected by respective historical output power information 301 for each beam 103 of a set of beams 103). For example, heat map 401 may indicate output power information (e.g., average output power information) for historical output power information 301-1 through 301-8 over a particular time window or set of time windows.

Figure 5:
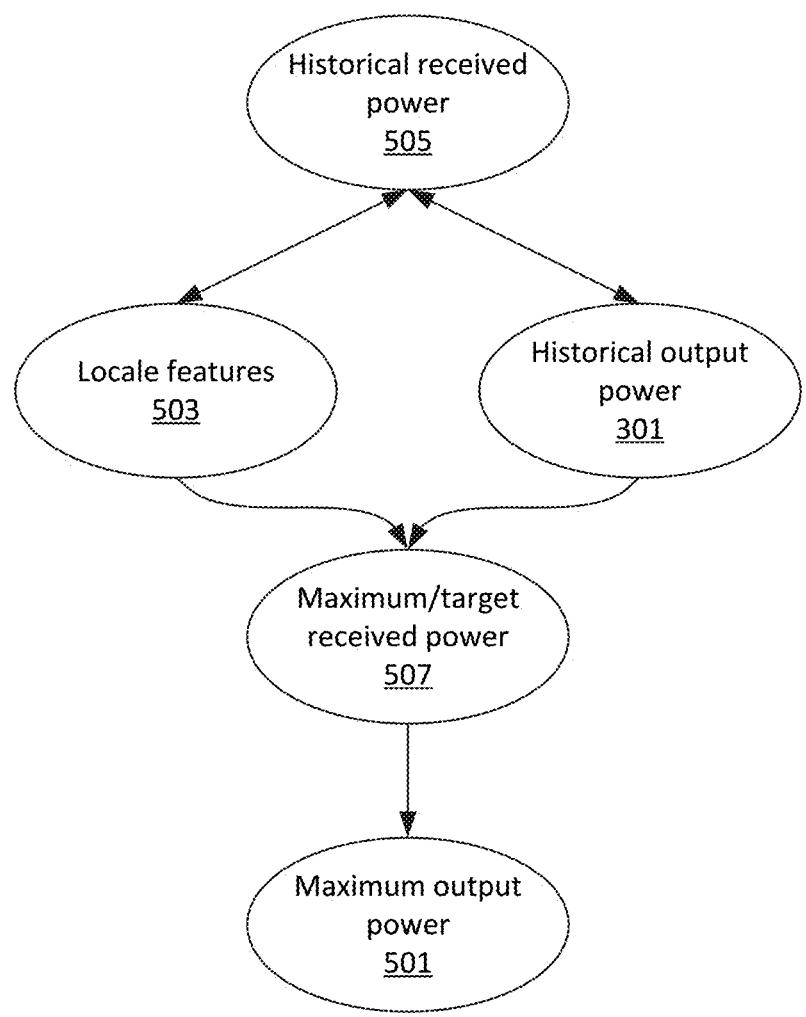
FIG. 5 illustrates example information that may be used to determine a maximum output power for a beam or set of beams, in accordance with one or more embodiments described herein.

As noted above, BPMS 105 may determine a maximum output power (e.g., for each beam 103) based on historical output power information 301 for each respective beam 103 and/or one or more other factors. For example, as shown in FIG. 5, BPMS 105 may compute maximum output power 501, for a given beam 103 at a given time, based on historical output power information 301 associated with beam 103, locale feature information 503 associated with beam 103, and maximum/target received power 507.

Locale features 503 may include information indicating attributes and/or features of a geographical region corresponding to beam 103 (e.g., a geographical region covered by beam 103). For example, locale features 503 may include information relating to building layout and/or density, topographical features (e.g., mountains, valleys, forests, streams, etc.), weather-related information, air quality-related information (e.g., smog density, particulate density, fog density, etc.), and/or other factors that may affect RF signal propagation or received signal power within the geographical region corresponding to beam 103. In some embodiments, locale features 503 may include output power information associated with neighboring beams 103 (e.g., beams within a threshold angle of beam 103, beams with a coverage area within a threshold distance of the coverage area of beam 103, etc.). Locale features 503 may include geographical coordinates (e.g., latitude and longitude coordinates, Global Positioning System ("GPS") coordinates, or the like) or other suitable location information, to indicate the geographical locations of respective features.

In some embodiments, locale feature information 503 may include, and/or be based on, historical received power information 505. Historical received power information 505 may indicate a measure of received signal power within the geographical region corresponding to beam 103. As noted above, a maximum or target received radio power (e.g., as measured in $mW/cm^2$ or some other suitable measurement) may be a factor based on which BPMS 105 may select a maximum output power for a given beam 103.

In some embodiments, historical received power information 505 may be determined based on measurements determined by UEs within the geographical region and/or other suitable devices that are capable of measuring the received signal power from base station 101 via beam 103. In some embodiments, historical received power information 505 may be estimated, determined, predicted, etc. based on one or more artificial intelligence/machine learning ("AI/ML") models or other suitable models that correlate locale features 503 to historical output power information 301. For example, given a particular set of locale features 503 and a particular set of historical output power information 301 for a given beam 103, such models may be used to identify a measure of received signal power 505 within a coverage area of beam 103.

Maximum/target received power 507 may include a maximum or target measure of received signal power within a coverage area of beam 103. In some embodiments, maximum/target received power 507 may include a predetermined value or some other suitably determined value, such as 1 $mW/cm^2$ or some other value. In some embodiments, maximum/target received power 507 may change with time or based on other conditions. For example, maximum/target received power 507 may indicate one value during daytime hours, and another value during nighttime hours. As another example, maximum/target received power 507 may indicate one value during weekdays, and another value during weekends.

BPMS 105 may determine maximum output power 501 based on historical output power information 301, locale features 503, and maximum/target received power 507. For example, if historical output power information 301 indicates that an average output power associated with beam 103 is relatively high, BPMS 105 may determine a relatively low value for maximum output power 501 in order to meet the maximum and/or target received power 507 for beam 103. As another example, if historical output power information 301 indicates that an average output power associated with beam 103 is relatively low, BPMS 105 may determine a relatively high value for maximum output power 501, as such relatively high value may still be low enough to meet the maximum and/or target received power 507 for beam 103.

Figure 6:
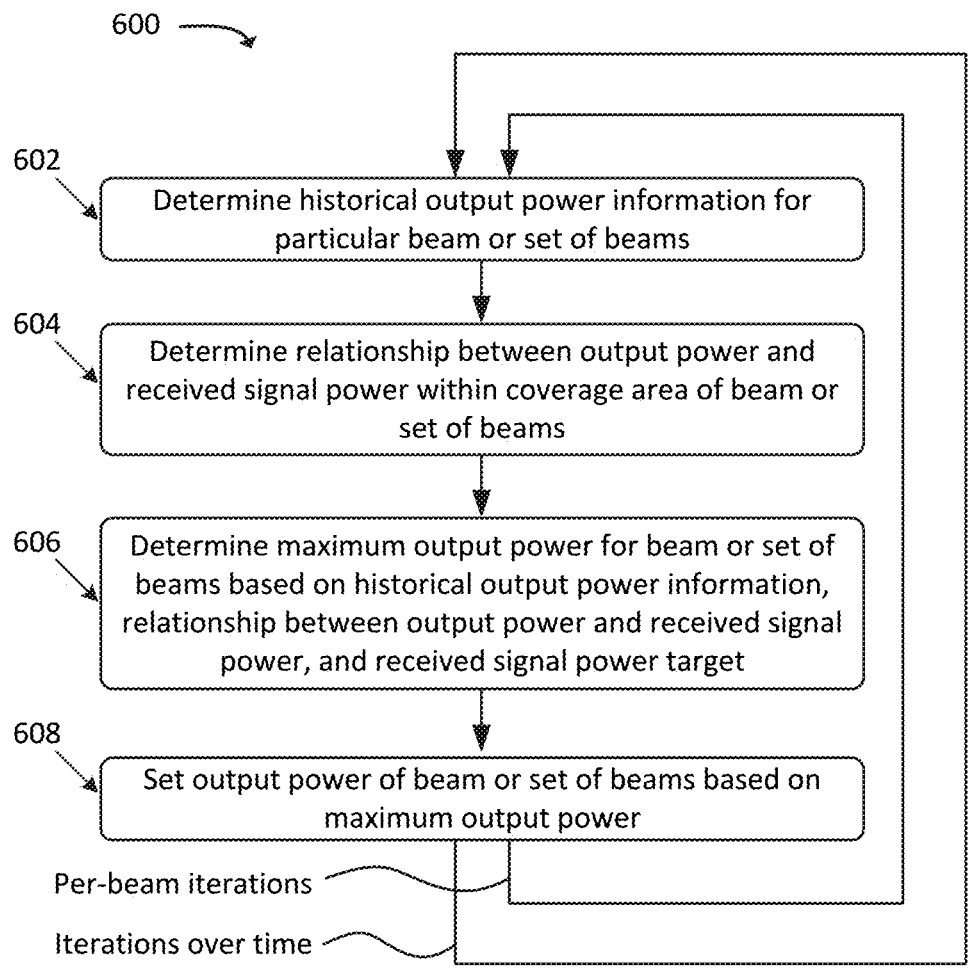
FIG. 6 illustrates an example process for setting a maximum output power for a particular beam or set of beams, in accordance with one or more embodiments described herein.

FIG. 6 illustrates an example process 600 for setting a maximum output power for a particular beam or set of beams based on historical output power information associated with the particular beam or set of beams. In some embodiments, some or all of process 600 may be performed by BPMS 105. In some embodiments, one or more other devices may perform some or all of process 600 in concert with, and/or in lieu of, BPMS 105.

As shown, process 600 may include determining (at 602) historical output power information for a particular beam 103 and/or set of beams 103 associated with a particular base station 101. For example, BPMS 105 may receive information (e.g., from base station 101 and/or some other suitable device or system) indicating a measure of output power, radiated power, etc. utilized to output RF signals via a particular beam 103, set of beams 103, direction, set of directions, etc. over a particular time period or set of time periods. As noted above, BPMS 105 may use a ring buffer 303, token bucket, IIR filter, and/or other suitable technique to determine an average, median, or other derived value reflecting output power, associated with the particular beam 103 or set of beams 103, over the particular time period or set of time periods.

Process 600 may further include determining (at 604) a relationship between output power, associated with the particular beam 103 or set of beams 103, and a received signal power within a coverage area associated with the particular beam 103 or set of beams 103. For example, as discussed above, BPMS 105 may utilize AI/ML techniques or other suitable techniques to determine, predict, etc. varying measures of received signal power within the coverage area, given varying measures of output power used to implement the particular beam 103 or set of beams 103. Such determination may be based on, for example, locale features 503 of the coverage area, measured values of historical received power 505, measured values of historical output power 301, and/or other suitable factors.

Process 600 may additionally include determining (at 606) a maximum output power for the beam 103 or set of beams 103 based on the historical output power information 301, the relationship between output power and received signal power, and a received signal power target. For example, BPMS 105 may identify a maximum received signal power (e.g., a maximum average received signal power over time), and may determine a maximum output power for the particular beam 103 or set of beams 103 for a subsequent time period (e.g., a time period subsequent to one or more time periods with which the historical output power information is based) such that the received signal power would not exceed the received signal power target during the subsequent time period if the maximum output power were to be used for the particular beam 103 or set of beams 103. In some embodiments, BPMS 105 may output the maximum output power information to a particular base station 101 with which the particular beam 103 or set of beams 103 are associated.

Process 600 may also include setting (at 608) an output power for the particular beam 103 or set of beams 103 based on the maximum output power. For example, BPMS 105 may instruct base station 101 to set the output power to a particular output power value that is equal to or lower than the maximum output power. Additionally, or alternatively, base station 101 may set the output power based on multiple factors (e.g., demand for wireless service, Quality of Service ("QoS") metrics, queue states, etc.), and may use the maximum output power value as a ceiling on the output power used to implement the particular beam 103 or set of beams 103, and/or may otherwise use the maximum output power value as a factor in setting the output power for the particular beam 103 or set of beams 103 for the subsequent time period. As noted above, setting the output power may include one or more of setting an antenna gain of one or more antennas that implement the particular beam 103 or set of beams 103, setting a conducted power provided to the one or more antennas, selecting a particular quantity of PRBs to implement via the particular beam 103 or set of beams 103, and/or other suitable techniques.

As further shown in FIG. 6, some or all of process 600 may be repeated in an iterative manner. For example, some or all of process 600 may be repeated for the same beam 103 or set of beams 103 over time. As another example, some or all of process 600 may be performed for multiple beams 103 or sets of beams 103 for the same time period or time periods. As yet another example, some or all of process 600 may be performed for multiple beams 103 or sets of beams 103 for multiple time periods (e.g., on an ongoing basis).

Figure 7:
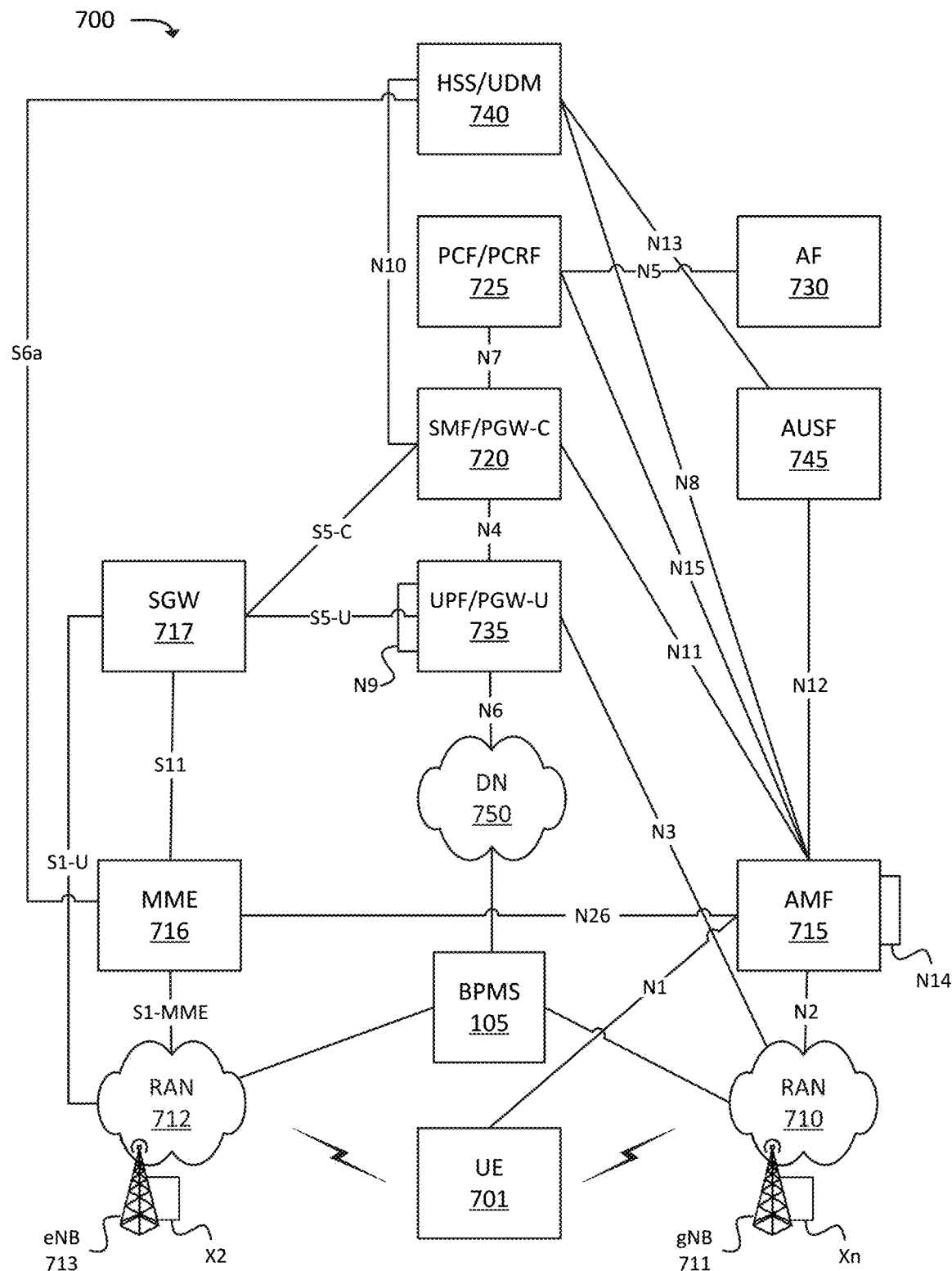
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as BPMS 105.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface. In some embodiments, base station 101 may be, may include, and/or may be implemented by one or more gNBs 711.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface. In some embodiments, base station 101 may be, may include, and/or may be implemented by one or more eNBs 713.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
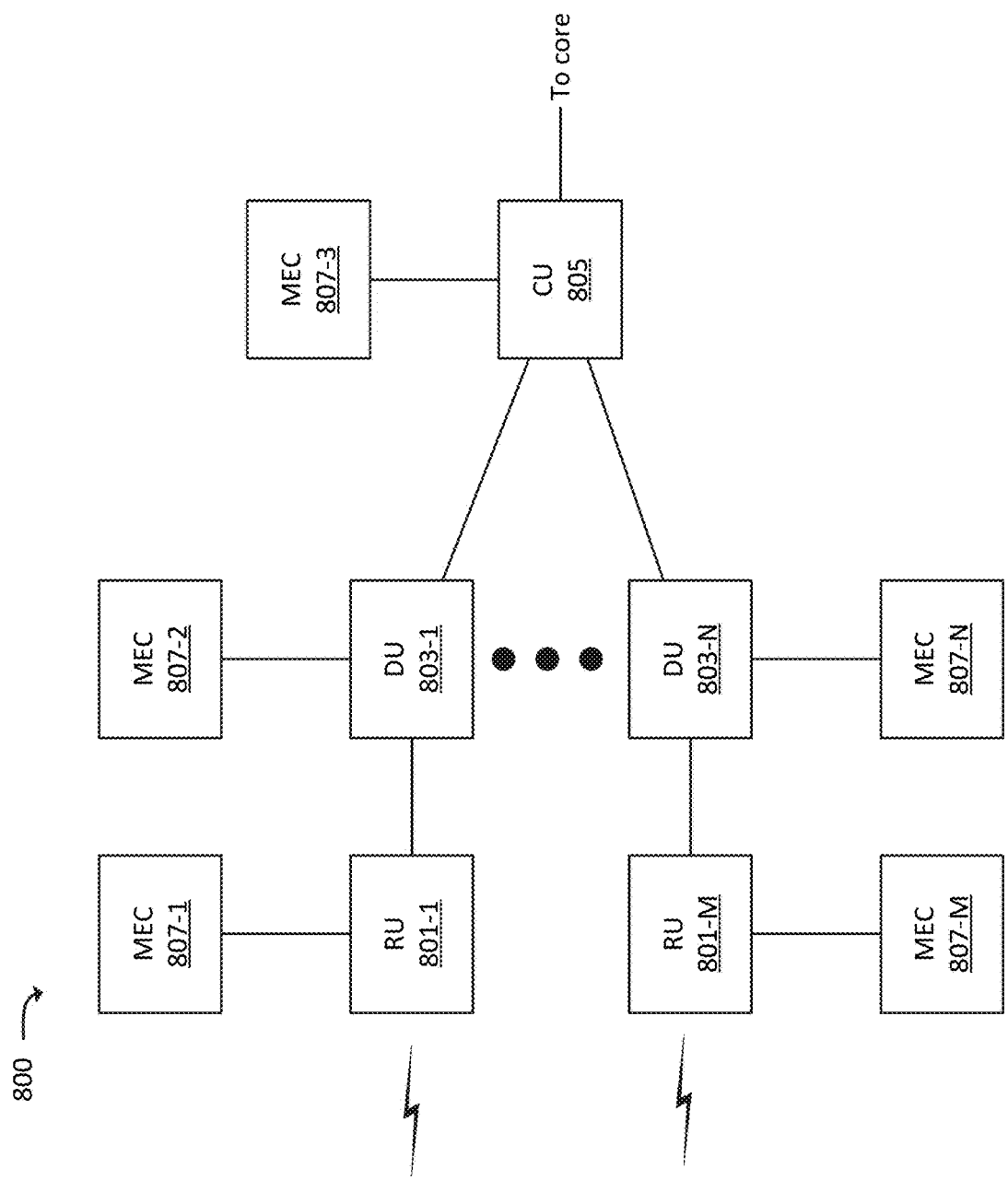
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to BPMS 105.

Figure 9:
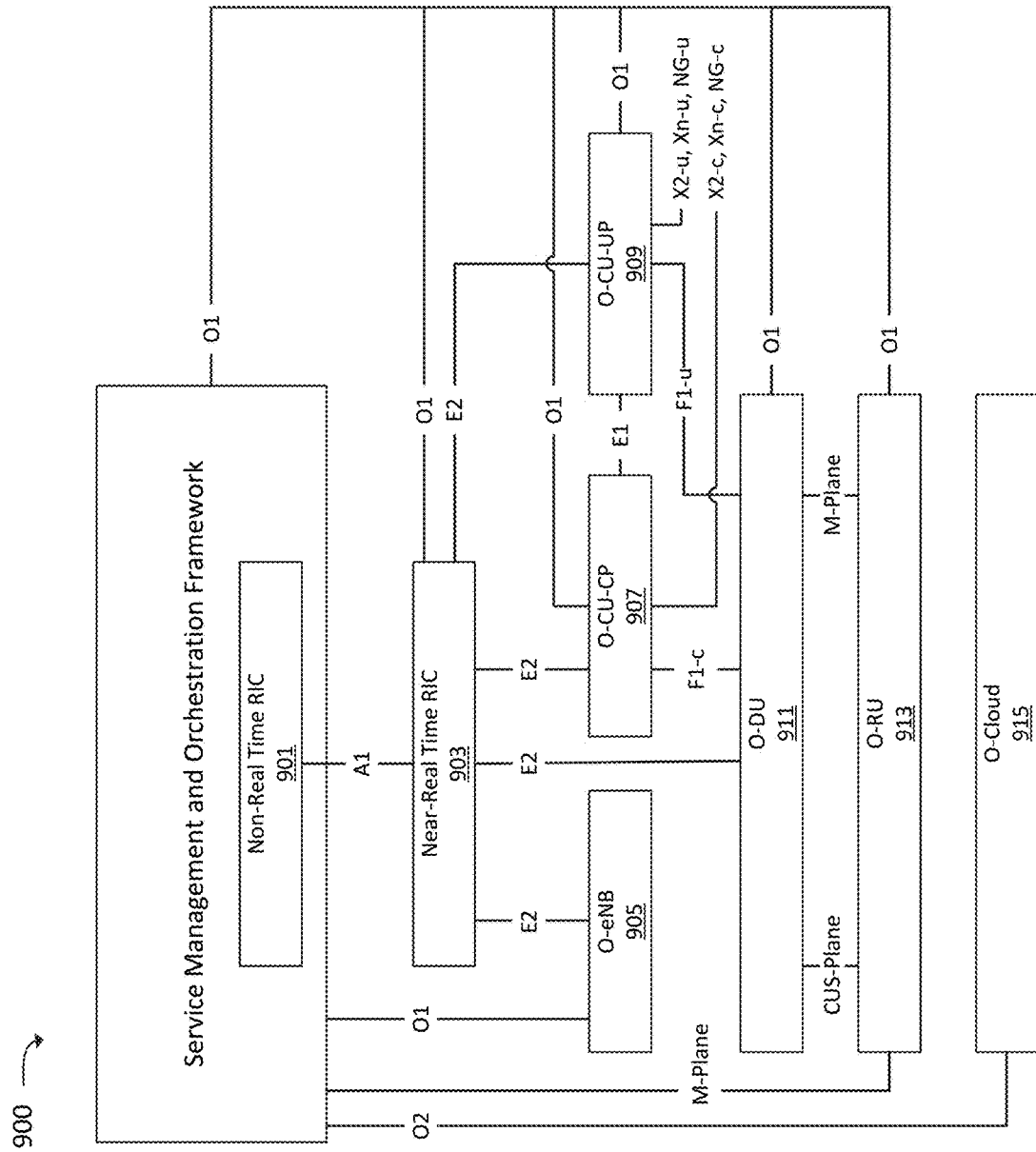
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation.

O-eNB 905 may perform functions similar to those described above with respect to eNB 713. For example, O-eNB 905 may facilitate wireless communications between UE 701 and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
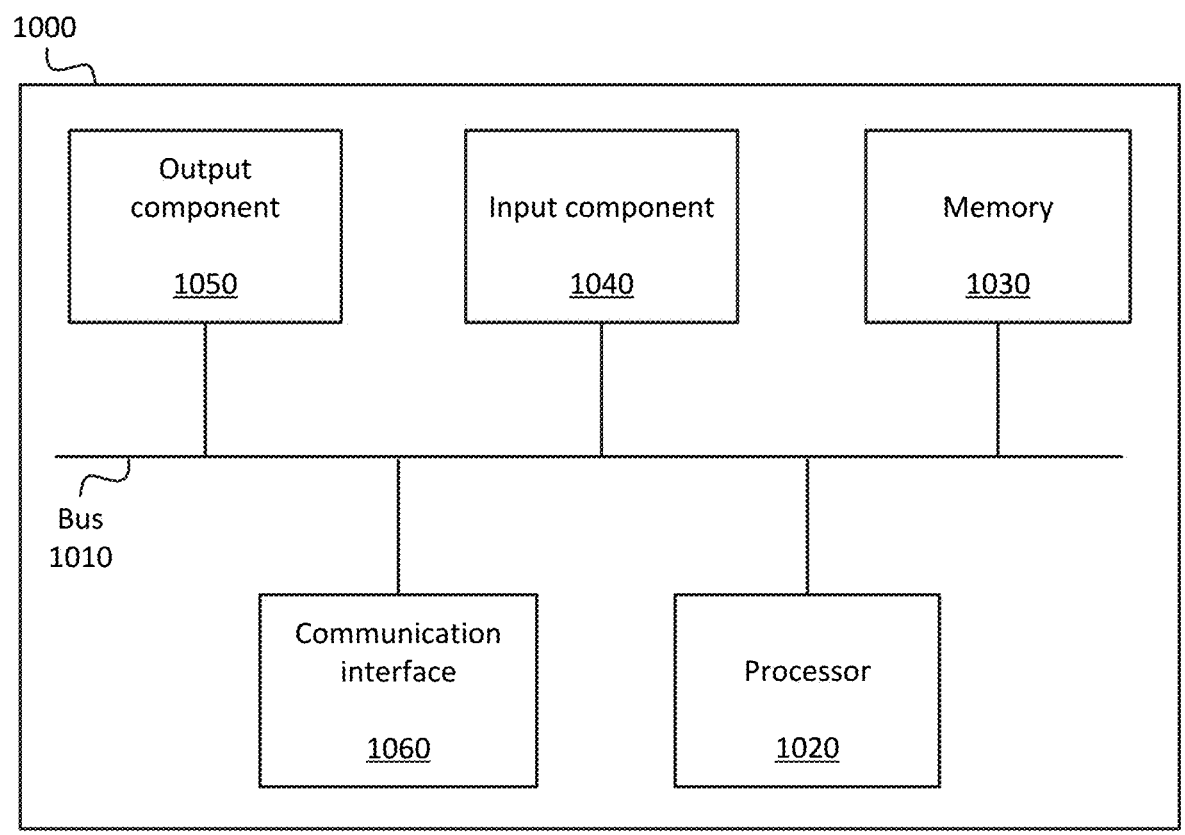
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
determine, for a particular set of beams of a plurality of sets of beams associated with a base station of a radio access network ("RAN"), historical output power information indicating a measure of output power associated with the particular set of beams over a first time period;
determine a maximum output power, for the particular set of beams for a second time period that is subsequent to the first time period, based on the historical output power information for the particular set of beams over the first time period; and
set an output power for the particular set of beams for the second time period based on the determined maximum output power.

2. The device of claim 1, wherein setting the output power for the particular set of beams for the second time period includes setting the output power for the second time period to a particular output power that is:
equal to the maximum output power, or
less than the maximum output power.

3. The device of claim 1, wherein the particular set of beams is a first set of beams of the plurality of sets of beams, wherein the maximum output power is a first maximum output power, and wherein the one or more processors are further configured to:
- determine, for a second particular set of beams of the plurality of sets of beams, historical output power information indicating a measure of output power associated with the second set of beams over the first time period; and
- determine a second maximum output power, for the second set of beams for the second time period, based on the historical output power information for the second set of beams over the first time period, wherein the first and second maximum output powers are different.

4. The device of claim 1, wherein setting the output power for the particular set of beams includes at least one of:
- selecting a quantity of Physical Resource Blocks ("PRBs") to utilize via the particular set of beams during the second time period,
- selecting an antenna gain for one or more antennas of the base station for the second time period, or
- selecting an amount of conducted power to provide to the one or more antennas for the second time period.

5. The device of claim 1, wherein determining the maximum output power is based on determining an amount of received signal power within a coverage area of the particular set of beams based on a relationship between the received signal power within the coverage area and an amount of output power associated with the particular set of beams.

6. The device of claim 5, wherein the relationship is based on one or more locale features of the coverage area.

7. The device of claim 1, wherein each set of beams, of the plurality of sets of beams, are associated with a particular portion of a coverage area associated with the base station.

8. A non-transitory computer-readable medium, storing a plurality of processor-executable instructions to:
- determine, for a particular set of beams of a plurality of sets of beams associated with a base station of a radio access network ("RAN"), historical output power information indicating a measure of output power associated with the particular set of beams over a first time period;
- determine a maximum output power, for the particular set of beams for a second time period that is subsequent to the first time period, based on the historical output power information for the particular set of beams over the first time period; and
- set an output power for the particular set of beams for the second time period based on the determined maximum output power.

9. The non-transitory computer-readable medium of claim 8, wherein setting the output power for the particular set of beams for the second time period includes setting the output power for the second time period to a particular output power that is:
- equal to the maximum output power, or
- less than the maximum output power.

10. The non-transitory computer-readable medium of claim 8, wherein the particular set of beams is a first set of beams of the plurality of sets of beams, wherein the maximum output power is a first maximum output power, and wherein the plurality of processor-executable instructions further include processor-executable instructions to:
- determine, for a second particular set of beams of the plurality of sets of beams, historical output power information indicating a measure of output power associated with the second set of beams over the first time period; and
- determine a second maximum output power, for the second set of beams for the second time period, based on the historical output power information for the second set of beams over the first time period, wherein the first and second maximum output powers are different.

11. The non-transitory computer-readable medium of claim 8, wherein setting the output power for the particular set of beams includes at least one of:
- selecting a quantity of Physical Resource Blocks ("PRBs") to utilize via the particular set of beams during the second time period,
- selecting an antenna gain for one or more antennas of the base station for the second time period, or
- selecting an amount of conducted power to provide to the one or more antennas for the second time period.

12. The non-transitory computer-readable medium of claim 8, wherein determining the maximum output power is based on determining an amount of received signal power within a coverage area of the particular set of beams based on a relationship between the received signal power within the coverage area and an amount of output power associated with the particular set of beams.

13. The non-transitory computer-readable medium of claim 8, wherein each set of beams, of the plurality of sets of beams, are associated with a particular portion of a coverage area associated with the base station.

14. The non-transitory computer-readable medium of claim 8, wherein the historical output power information is based on a plurality of output power values associated with the first set of beams measured over the first time period.

15. A method, comprising:
- determine, for a particular set of beams of a plurality of sets of beams associated with a base station of a radio access network ("RAN"), historical output power information indicating a measure of output power associated with the particular set of beams over a first time period;
- determine a maximum output power, for the particular set of beams for a second time period that is subsequent to the first time period, based on the historical output power information for the particular set of beams over the first time period; and
- set an output power for the particular set of beams for the second time period based on the determined maximum output power.

16. The method of claim 15, wherein setting the output power for the particular set of beams for the second time period includes setting the output power for the second time period to a particular output power that is:
- equal to the maximum output power, or
- less than the maximum output power.

17. The method of claim 15, wherein the particular set of beams is a first set of beams of the plurality of sets of beams, wherein the maximum output power is a first maximum output power, and the method further comprising:
- determine, for a second particular set of beams of the plurality of sets of beams, historical output power information indicating a measure of output power associated with the second set of beams over the first time period; and
- determine a second maximum output power, for the second set of beams for the second time period, based on the historical output power information for the second set of beams over the first time period, wherein the first and second maximum output powers are different.

18. The method of claim 15, wherein setting the output power for the particular set of beams includes at least one of:
- selecting a quantity of Physical Resource Blocks ("PRBs") to utilize via the particular set of beams during the second time period,
- selecting an antenna gain for one or more antennas of the base station for the second time period, or
- selecting an amount of conducted power to provide to the one or more antennas for the second time period.

19. The method of claim 15, wherein determining the maximum output power is based on one or more locale features of the coverage area.

20. The method of claim 15, wherein each set of beams, of the plurality of sets of beams, are associated with a particular portion of a coverage area associated with the base station.

* * * * *